United States Patent Office 3,535,385
Patented Oct. 20, 1970

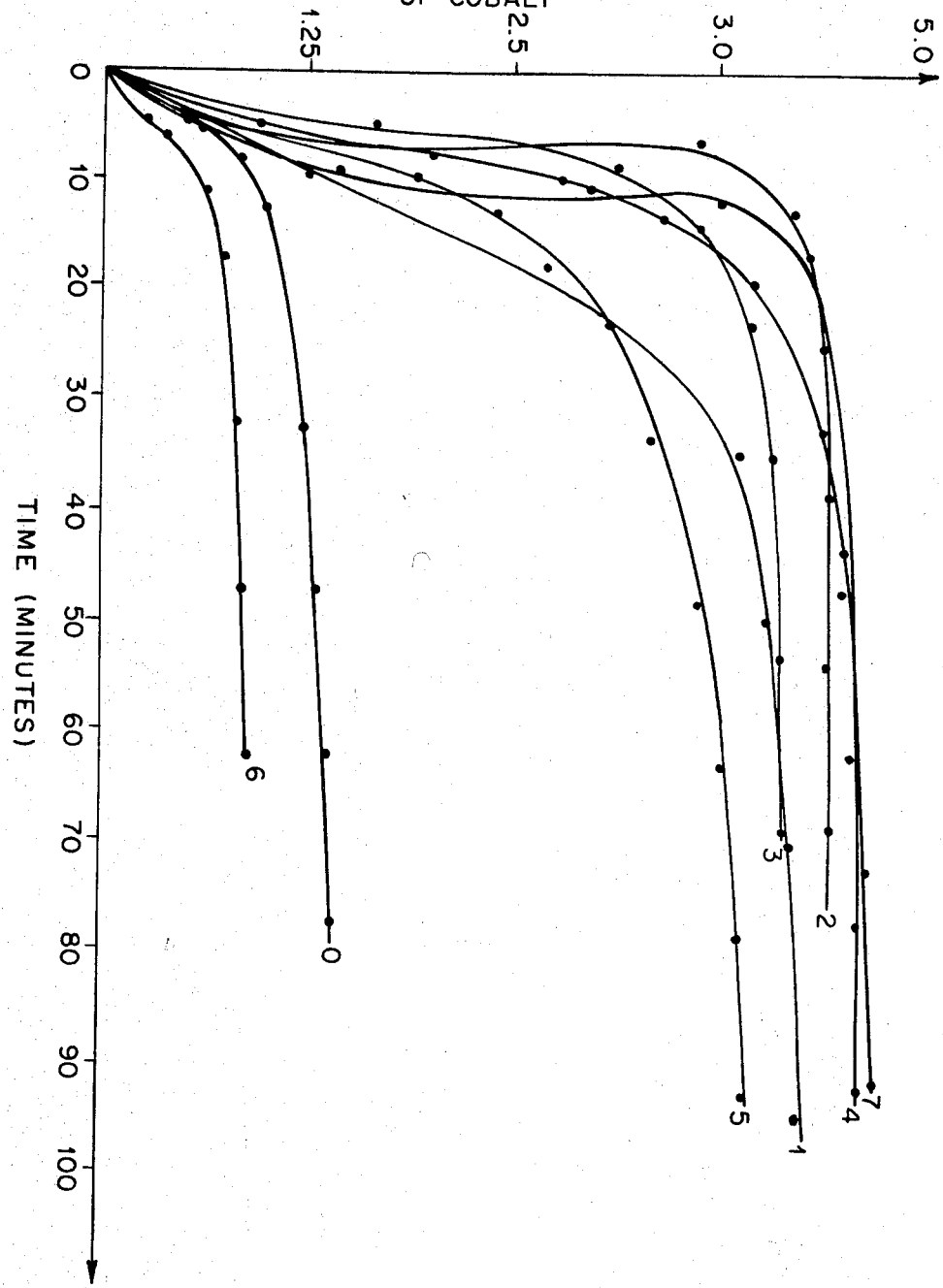

3,535,385
HYDROFORMYLATION PROCESS
Harry Endler, Ferrara, Italy, assignor to Montecatini Edison S.p.A., Milan, Italy
Filed Dec. 27, 1963, Ser. No. 333,807
Claims priority, application Italy, Jan. 4, 1963, 112/63; Sept. 18, 1963, 39,069/63
Int. Cl. C07c 45/12
U.S. Cl. 260—604                 1 Claim

ABSTRACT OF THE DISCLOSURE

Disclosed is a process for the hydroformylation of olefins. This process comprises treating spent cobalt catalyst removed from the purification stage with an oxygen-containing gas at elevated temperatures in the presence of an aliphatic carboxylic acid and recycling the treated catalyst to the hydroformylation process. The elevated temperature is usually between 70 and 250° C. and is preferably from 110 to 250° C. and particularly from 150 to 250° C.

---

My invention relates to the production of oxygenated compounds by hydroformylation of olefins with carbon monoxide and hydrogen in the presence of cobalt catalysts. This process is well known as the so-called "Oxo process. Specifically, my invention provides an "Oxo proccess" in which the spent cobalt-containing catalyst is put into a form, from which it can be converted very readily into the carbonyl or hydrocarbonyl, before being recycled to the reaction.

It is generally accepted that in the "Oxo process" the active form of cobalt-containing catalyst is the hydrocarbonyl or carbonyl. At the end of the reaction, the cobalt carbonyls have to be removed from the reaction mixture, at the high pressure reactor outlet, to avoid the dangerous influence of cobalt and carbon monoxide to successive reactions such as hydrogenation and aldolization of aldehydes. Furthermore, recovery of cobalt is necessary due to the fact that, for economic reasons, it should be recycled to the synthesis stage.

In many cases cobalt is recovered ina cobalt-containing sludge from a column in which the aldehydes are separated by flash distillation. This cobalt-containing sludge also contains high boiling by-products such as esters and alcohols. The cobalt is usually in the form of cobalt carboxylates and metallic cobalt.

It is known that practically all cobalt compounds, as well as metallic cobalt can be transformed into the active carbonyl at temperatures between 100 and 200° C. and at pressures between 150 and 300 atm. of water gas, i.e. under the conditions existing in the carbonylation reactor. The formation of cobalt carbonyls and hydrocarbonyls often has a long induction time because various cobalt salts have very different activities with respect to their transformation into carbonyl. This is a disadvantage because the presence of unchanged cobalt compounds causes a reduction in useful reactor space, and in addition, side reactions are enhanced, such as condensation reactions catalyzed by an excess of free cobalt. For instance, the copending application of myself and S. Pappada, based on Italian patent application 22,441/62 of Nov. 15, 1962, Ser. No. 322,505, filed Nov. 8, 1963, describes a process for the de-metallization, particularly of cobalt, of olefin oxosynthesis reaction mixtures. The method of that invention consists of heat treatment under atmospheric or similar pressure, in the presence of non-aqueous organic acids, on the reaction mixture, thus obtaining the transformation of the carbonyls and other metal compounds, mostly into salts of fatty acids which are easily carbonylated.

To avoid the disadvantages mentioned above, my present invention provides an "Oxo process" in which the spent cobalt-containing catalyst is put into a form, from which it can be converted very readily into the carbonyl or hydrocarbonyl, before being recycled to the reaction.

According to my invention, a process for the hydroformylation of olefins is provided in which spent cobalt catalyst removed from the purification stage is treated with an oxygen-containing gas at an elevated temperature in the presence of an aliphatic carboxylic acid before being returned to the carbonylation stage.

A suitable elevated temperature is in the range of 70° to 250° C. and is preferably from 110 to 250° C. The reaction may also be carried out in the presence of a solvent. The oxygen-containing gas may be oxygen or air, for example.

If the treatment is carried out in the presence of a solvent, the amount of carboxylic acid used may be greatly reduced. According to the solvent and, less importantly, to the amount and the quality of the carboxylic acids, the oxidation may result in cobalt salts that are either dissolved or solid. In either case, the cobalt salts will be converted to their active forms in the carbonylation reaction, suitable for hydroformylation, without long induction periods, and the choice will depend only upon practical considerations.

In the process of my invention, any aliphatic carboxylic acid may be employed, but fatty acids having from 2 to 8 carbon atoms are preferred. The amount of carboxylic acid added depends upon the temperature and whether or not a solvent is used. Thus, at temperatures in the range of 110° to 250° C., particularly 150° to 250° C., in the oxidation treatment carried out in the presence of a high boiling fraction of the "Oxo" reaction mixture, a part of the oxygenated compounds present react to form the carboxylic acid insitu. Thus, little or no addition of carboxylic acid is necessary. The amount of acid present in the oxidation should, however, preferably be in excess of the stoichiometric amount required for the amount of cobalt in the spent catalyst. Furthermore, the higher the temperature within the range 70–250° C., the greater the amount of spent catalyst which will quickly be concerted to carbonyl or hydrocarbonyl in the carbonylation reactor. For this reason, temperatures of from 150° C. to 250° C. are the most preferable for treatment with oxygen-containing gas, according to the invention.

Solvents used preferably are, for example, benzene, toluene, alcohols and esters. In addition, the alcohol and ester mixtures, produced in the "Oxo" synthesis as high boiling liquids, located at the bottom of the flask distillation column, are particularly suitable. As a result, the suspensions of sludge coming from the flask distillation can be used as such.

It has been found that any cobalt salt may be used as a catalyst source. This is due to the fact that cobalt is transformed into its carbonyls in the carbonylation zone, and the respective carbonyl then, in the decobaltization step, gives rise to cobalt-containing sludge having a composition characteristic of the corresponding "Oxo" reaction. The composition of the thermal decomposition product may vary within wide ranges and may contain different amounts of metallic cobalt. By suitable choice of acids and solvents, it is possible to remove residual salts, such as formate, which are less active to carbonylation, by filtration after the oxidation treatment.

By means of the curves in the graph of the figure, a comparison has been made between the activities for the recarbonylation of the cobalt-containing mixtures, on the basis of the rate of the formation of the carbonyl.

The abscissa denotes times in minutes, while the ordinate denotes mols of water gas absorbed per gram atom of cobalt. The carbonylation test is carried out by reacting the cobalt salt, dissolved or suspended in toluene, with water-gas in an autoclave, under 200 atmospheres pressure and at a temperature of 150° C.

By means of this test both the amount of cobalt carbonyl formed and the volume of gas absorbed at constant temperature and constant pressure are determined, by successive additions of water-gas in order to compensate for the absorption.

To further illustrate the poor activity of the cobalt-containing material before oxidation treatment and in particular that of pure cobalt formate (as an example of an almost inactive component), activity curves marked respectively by means of the numbers 0 (cobalt-containing material) and 6 (cobalt formate) have been plotted on the graph.

Also for purposes of comparison, curve number 7 showing the activity of pure cobalt butyrate, has been plotted as an example of a component having high activity of carbonylation.

The curve relating to cobalt metal has not been shown because, under the conditions used in this test, metallic cobalt cannot be transformed into carbonyl.

The other curves are marked by means of a number, which corresponds to the number of the respective example illustrated.

In the following examples the cobalt-containing material comprised a sludge produced in the hydroformylation of propylene under normal conditions, i.e. at a pressure of 200–250 atm. of water-gas and at a temperature of 100–120° C., with a total cobalt concentration of about 2 g./l of the reaction mixture. Such concentration can be obtained by recycling about 90% of the cobalt sludge from the bottom of the flash distillation column and restoring the remaining 10% by fresh salt, as for example basic cobalt carbonate.

The invention will be further described in conjunction with the following specific examples, but these examples are used only for the purposes of illustration and are not intended to limit the invention thereto.

EXAMPLE 1

30 g. of cobalt-containing sludge, coming from the flash-distillation column used in the decobaltization of the reaction mixture, resulting from hydroformylation of propylene, were suspended in 300 cc. of acetic acid and introduced into a flask provided with a refrigerator. The composition of the cobalt-containing material was: 29% of metallic cobalt, 15% of cobalt formate, 54.5% of cobalt butyrate and 1.5% of other organic substances.

For 12 hours a flow of 15 l./h. of air was charged into the suspension which was heated to 90° C. and agitated.

At the end of the operation, a residue of undissolved substance equal to 11.5 g., consisting of 93% of cobalt acetate was obtained. 32 g. more of the same salt were found dissolved in the liquid.

Both the residue and the solution may be directly used as catalystic precursors in the hydroformylation process. This was illustrated by the fact that both were transformed into cobalt carbonyl, with a conversion of 98%, when treated in an autoclave with CO and $H_2$ at 150° C. and 200 atm. The amount of cobalt carbonyl in the reaction mixture discharged from the autoclave was determined by a gas volumetric method, by decomposition of the carbonyl with iodine and determination of the carbon monoxide evolved, according to the method of Fisher-Tropsch Brennstoff-Chemie 4, 276 (1923), or also Sternberg, Wender and Orchin, Anal. Chem., 24, 174 (1952).

COMPARATIVE TEST

As a comparative test, the carbonylation of the cobalt-containing sludge was carried out without previous oxidation in organic acid medium, and a conversion to carbonyl of 27% was obtained. For the purpose of comparison, results of comparative tests on the basis of the gas absorption curves for the cobalt-containing sludges of Examples 1 to 5 are reported on the graph.

This activity is expressed as the mols of gas absorbed per mol of cobalt bearing in mind that a gram atom of cobalt requires 5 mols of water gas for its transformation into carbonyl, according to the equation:

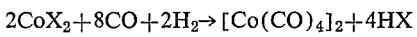

$$2CoX_2 + 8CO + 2H_2 \rightarrow [Co(CO)_4]_2 + 4HX$$

The curve relating to the Example 1 is that marked with number 1, while curve 0 is that of the activity of the initial cobalt-containing material which did not undergo oxidation treatment in organic acid medium.

From the curves it is seen that the cobalt-containing materials treated according to the process of the present invention have an activity of from three to four times that of the untreated material.

EXAMPLE 2

In a flask provided with a refrigerator, 100 g. of the cobalt-containing material described in Example 1 were suspended in 100 g. of isobutyric acid. For 12 hours a flow of 15 l./h. of air was charged into the suspension which was heated to 90° C. and agitated. After treatment, the cobalt was in the form of a solution with the exception of a negligible amount of residue. The solution may be directly used as catalytic promoter in the hydroformylation since in a carbonylation test at 150° C. and at 200 atms. of CO and $H_2$ with a ratio $CO/H_2$ equal to 1:1, a conversion of 78% into cobalt carbonyl was obtained. The curve, numbered 2, plotting the absorption of the gas with time shows that the activity of the treated sludge is much higher than that of the initial untreated cobalt sludge.

EXAMPLE 3

In this example, a solvent was used in which oxidation treatment yielded insoluble cobalt salts, having a particular fineness and activity. The solvent used was a fraction of the mixture obtained in the hydroformylation of propylene and in the higher boiling fraction of butyric aldehydes. This fraction is usually considered as a by-product and comprises aliphatic aldehydes, esters, alcohols and acids characterized by the following:

Carbonyl number=195
Hydroxyl number=60
Saponification number=48
Acidity number=4.1

The distillation curve ASTM has the following figure:

| | ° C. |
|---|---|
| Initial boiling point | 85 |
| Percent vol. distilled at: | |
| 5 | 102 |
| 10 | 122 |
| 20 | 198 |
| 30 | 226 |
| 40 | 247 |
| 50 | 268 |
| 60% vol. distilled up to | 300 |

30 g. of the cobalt-containing material, as in Example 1, were suspended in 125 g. of the solvent, with the addition of 25 g. of butyric acid, and were introduced into a flask provided with a refrigerator. In the mixture heated at 90° C. and agitated, a flow of air 20 l./h. was charged for 10 hours. At the end of the operation most of the cobalt was in the form of a fine precipitate, which was separated by filtration, while a small amount remained in solution.

53 g. of crystalline precipitate very finely divided, having a specific surface of 9 m.²/g. determined according to Barret, Anal. Chem. 23, 791 (1951) were obtained having the following characteristics:

| | Percent |
|---|---|
| Cobalt butyrate | 84 |
| Cobalt formate | 12 |
| Organic substances | 2 |
| Metal cobalt | <2 |

The activity test on the precipitate of the cobalt salts by carbonylation, under the conditions of the preceding examples gave a conversion of 74%. The curve, numbered 3, plotting the absorption of gas with time, shown in FIG. 1, indicates that the treated cobalt-containing sludge has an activity three times that of the same cobalt-containing material before treatment.

EXAMPLE 4

In this example the use of a solvent is described wherein the cobalt salts produced by the oxidation treatment are substantially soluble, a small insoluble fraction, which is less active, being removed by filtration.

10 g. of the cobalt-containing material as in Example 1, were suspended in 100 g. of 2-ethylhexanoic acid, in a flask provided with a refrigerator. While heating at 90° C. under agitation, a flow of 15 l./h. of air was charged into the suspension for 12 hours. At the end of the reaction the solution contained 25 g. of cobalt 2-ethylhexanoic, while the undissolved portion comprised about 1 g. of a residue which was then removed by filtration. This residue comprised 84% formate and 13% cobalt butyrate and was removed because it has poor activity of carbonylation. The solution of cobalt 2-ethylhexanoic, when tested as described in the preceding examples for activity, had a conversion of 89% to cobalt carbonyl. The gas absorption curve 4 indicates higher activity over that of the untreated cobalt-containing material. Therefore, by the process of the present invention the cobalt sludge was transformed, with a yield of 90%, into an active catalytic promotor for the hydroformylation process.

EXAMPLE 5

300 g. of the cobalt-containing materials as in Example 1 were introduced into a flask provided with a refrigerator and agitator and suspended in 1340 g. of toluene, with the addition of 160 g. of isobutyric acid. While heating the mixture to 90° C., a flow of 15 l./h. of air was charged for 20 hours. At the end of the operation 350 g. of a crystalline precipitate, finely divided and having a specific surface of 13 m.²/g., was obtained having the following composition:

| | Percent |
|---|---|
| Cobalt isobutyrate | 78 |
| Cobalt formate | 18 |
| Metallic cobalt | 4 |

The activity test on this precipitate suspended in toluene, by carbonylation with a ratio $CO/H_2 = 1:1$ gave a conversion rate of 84%. The gas absorption curve 5 in the diagram indicates that the activity of this cobalt-containing material is about three times that of the original untreated cobalt-containing material.

EXAMPLE 6

35 g. of cobalt-containing material, having a total cobalt content of 56.4% and consisting of 35% metallic cobalt, 13.9% cobalt formate and 51.1% cobalt butyrate, were introduced into a flask provided with a refrigerator and stirred and suspended into 1500 g. of a liquid consisting of the highest boiling fraction of the byproducts obtained from propylene hydroformylation.

This fraction contained carbonylic substances, esters, alcohols and acids and was characterized by the following conventional numbers:

NCO—190

NOH—87

NS—32

NA—4.1

The distillation curve in accordance with ASTM is given by the following values:

| | °C. |
|---|---|
| Initial boiling point | 96 |
| Percent vol. distilled at: | |
| 5 | 160 |
| 10 | 178 |
| 20 | 195 |
| 30 | 210 |
| 40 | 228 |
| 50 | 248 |
| 60 | 270 |
| 70 | 285 |
| 77% vol. distilled up to | 300 |

After heating the suspension at 200° C. and agitating, a flow of air of 15 l./h. is charged for 14 hours.

At the end of the operation, 18 g. of cobalt in the form of carboxylic salts were present in the solution because carboxylic acids already present in the suspending liquid or formed in situ during the treatment were utilized.

An activity test as described in the preceding examples on this cobalt solution by carbonylation with a 1:1 ratio gave a conversion rate into cobalt carbonyl of 91%.

I claim:

1. A process for the hydroformylation of olefins which comprises treating spent cobalt catalyst obtained as a residue from flash-distillation in the decobaltization of the reaction mixture resulting from hydroformylation of propylene, with an oxygen-containing gas of the group consisting of oxygen and air at a rate of 15 to 20 l./h. for 10 to 20 hours and at a temperature of between 70 and 250° in the presence of an aliphatic carboxylic acid of the group consisting of acetic acid, isobutyric acid, butyric acid, and 2-ethylhexanoic acid, and recycling the catalyst in the form of a residue or liquid to said process.

References Cited

UNITED STATES PATENTS

| 2,547,178 | 4/1951 | Spence. |
| 2,751,403 | 6/1956 | Mertyweiller. |
| 2,963,514 | 12/1960 | Rehn et al. |
| 2,609,337 | 9/1952 | Taylor | 260—604 X |

BERNARD HELFIN, Primary Examiner

R. H. LILES, Assistant Examiner